(12) United States Patent
Clark et al.

(10) Patent No.: US 7,604,131 B1
(45) Date of Patent: Oct. 20, 2009

(54) SLIDING STORAGE RACK

(76) Inventors: John M. Clark, 9708 W. Park Village Dr., Tampa, FL (US) 33626; Stephen A. Smith, 2561 SW. 3rd Ave., Okeechobee, FL (US) 34974

( * ) Notice: Subject to any disclaimer, the term of this patent is extended or adjusted under 35 U.S.C. 154(b) by 315 days.

(21) Appl. No.: 11/379,663

(22) Filed: Apr. 21, 2006

Related U.S. Application Data

(60) Provisional application No. 60/594,607, filed on Apr. 22, 2005.

(51) Int. Cl.
*A47F 7/00* (2006.01)

(52) U.S. Cl. .................. 211/17; 211/118; 211/94.01; 211/162

(58) Field of Classification Search ......... 211/17–20, 211/23, 113, 118, 151, 162, 94.02, 94.01, 211/86.01; 224/924; 248/317, 339, 340, 248/215, 692, 690, 237, 228.1, 304, 305
See application file for complete search history.

(56) References Cited

U.S. PATENT DOCUMENTS

| | | | | | |
|---|---|---|---|---|---|
| 356,125 | A | * | 1/1887 | Holzhalb | 211/85.3 |
| 1,132,190 | A | * | 3/1915 | Kohout | 211/85.3 |
| 1,415,316 | A | * | 5/1922 | Corbin | 211/85.3 |
| 2,757,804 | A | * | 8/1956 | Sadwin | 211/94.01 |
| 2,771,196 | A | * | 11/1956 | Scheuermann | 211/94.02 |
| 3,335,872 | A | * | 8/1967 | Dodich | 211/85.3 |
| 3,389,807 | A | * | 6/1968 | Manning et. al. | 211/85.3 |
| 3,954,182 | A | * | 5/1976 | McEvers | 211/94.01 |
| D273,645 | S | * | 5/1984 | McEvers | D6/513 |
| D277,436 | S | * | 2/1985 | Benedict | D6/315 |
| 4,585,127 | A | * | 4/1986 | Benedict | 211/34 |
| 4,771,899 | A | * | 9/1988 | Benedict et al. | 211/60.1 |
| 5,086,930 | A | * | 2/1992 | Saeks | 211/17 |
| 5,092,504 | A | * | 3/1992 | Hannes et al. | 224/403 |
| 5,183,162 | A | * | 2/1993 | Ritzenthaler | 211/1.57 |
| 5,191,984 | A | * | 3/1993 | Kon et al. | 211/115 |
| 5,402,979 | A | * | 4/1995 | Bellamy | 248/318 |
| 5,960,967 | A | * | 10/1999 | Neil | 211/94.01 |
| 5,988,403 | A | * | 11/1999 | Robideau | 211/20 |
| 6,182,836 | B1 | | 2/2001 | Gutierrez | |
| 6,237,781 | B1 | * | 5/2001 | Dahl | 211/17 |
| 6,484,893 | B1 | * | 11/2002 | Tkatch | 211/94.02 |
| 6,719,158 | B2 | * | 4/2004 | Goldberg | 211/123 |
| 6,871,749 | B2 | * | 3/2005 | Bostick et al. | 211/94.01 |
| 6,976,595 | B1 | * | 12/2005 | Geller | 211/94.01 |
| 7,165,684 | B2 | * | 1/2007 | Ferron | 211/19 |
| 2004/0060878 | A1 | * | 4/2004 | Ho | 211/17 |
| 2004/0226899 | A1 | | 11/2004 | Ferron | |

* cited by examiner

*Primary Examiner*—Jennifer E. Novosad
(74) *Attorney, Agent, or Firm*—Ronald E. Smith; Smith & Hopen, P.A.

(57) ABSTRACT

A storage rack that can be mounted to the ceiling to allow easy loading and unloading of multiple items, such as bikes. The stored items ride along a longitudinal track which allows a single item, in a row of many, to be removed without disturbing the remaining items.

2 Claims, 6 Drawing Sheets

SLIDING STORAGE RACK

CROSS REFERENCE TO RELATED APPLICATIONS

This application claims priority to U.S. Provisional Patent Application No. 60/594,607, filed Apr. 22, 2005.

FIELD OF THE INVENTION

The present invention relates to a moveable storage device for bicycles. Specifically, the sliding nature of the apparatus allows easy access to bicycles when multiple bikes are placed on the rack.

BACKGROUND OF THE INVENTION

Vast arrays of bicycle racks have been developed to allow users to free the space taken by multiple bicycles. Many of the bike racks of the prior art are static in nature and simply hang bikes side-by-side in an inverted fashion.

For example, U.S. Patent Application No. 2004/0,226,899 to Ferron describes a bike rack using downwardly traversing opening wheel hooks adapted to receive the tires of an inverted bicycle. Once placed on the hooks the bike may be slid transversely, with regard to orientation of the bike. In this manner, multiple bikes are concentrated in a smaller space. It is therefore necessary, however, to move unwanted bikes to gain access to a particular bike which is inward on the rack.

Therefore, what is needed is a space-saving bicycle storage system capable of storing multiple bikes of different makes and models that allows access to each individual bike independent of the others on the rack.

SUMMARY OF THE INVENTION

The novel invention includes a bike rack comprising at least one longitudinal track equipped with a plurality of receiving members moveably attached to the longitudinal track whereby each receiving hook is capable of sliding along the longitudinal axis of the longitudinal track. In a general embodiment, the receiving members are hooks that are adapted to receive the wheels of an inverted bicycle.

In one embodiment the longitudinal track is a C-channel. The receiving members are moveably attached to the longitudinal track by wheels which that ride within the C-channel. Accordingly, the space-saving bicycle storage system is capable of storing multiple bikes of different makes and models and allows access to each individual bike independent independently of the others other bikes on the rack. More particularly, the novel bicycle storage rack includes a first elongate channel member having a back wall adapted to be secured to a ceiling and a pair of parallel side walls formed integrally with the back wall that depend from opposite edges thereof in normal relation to the back wall. The novel structure further includes a pair of capture walls. Each of the side walls has a substantially ninety degree (90°) bend formed therein to form said pair of capture walls. Each capture wall of the pair of capture walls is disposed in a plane substantially parallel to a plane of the back wall. A gap of uniform extent is disposed between the capture walls of the pair of capture walls. The novel structure further includes a first pair of laterally disposed wheels and a first axle having opposite ends. The wheels of the first pair of laterally disposed wheels are journaled to opposite ends of the first axle. Each wheel of said pair of laterally disposed wheels is adapted to rollingly engage a different capture wall of the opposed pair of capture walls. A second pair of laterally disposed wheels is also provided. A second axle having opposite ends has one wheel of said second pair of laterally disposed wheels journaled to each end thereof and each wheel of said second pair of laterally disposed wheels is adapted to rollingly engage a different capture wall of said opposed pair of capture walls. An elongate, rigid support member has a top wall and a bottom wall. A first rigid post interconnects the first axle to a leading end of the top wall of the elongate, rigid support member. A second rigid post interconnects the second axle to a trailing end of the top wall of the elongate, rigid support member. A first hook depends from a leading end of the bottom wall of the elongate, rigid support member and a second hook depends from a trailing end of the bottom wall of the elongate, rigid support member. The first elongate channel member has a longitudinal extent greater than a longitudinal extent of the elongate, rigid support member so that the elongate, rigid support member is adapted to be manually movable from a first end of the first, elongate channel member to a second end of the first elongate channel member. The first and second pair of wheels rollingly engage the capture walls when the rigid support member is manually moved from the first end to the second end of the first elongate channel member. The first and second hooks are positioned a fixed distance apart from one another and remain a fixed distance apart from one another when the rigid support member is manually moved from the first end to the second end of the elongate channel. A second elongate channel member has a structure like that of the first elongate channel member but has larger dimensions so that the second elongate channel member is adapted to telescopically receive the first elongate channel member. The respective sidewalls of the first and second elongate channel members have a plurality of apertures formed in them along their respective extents so that a transversely disposed pin can lock the first and second elongate channel members into any preselected position of telescopic adjustment.

DETAILED DESCRIPTION OF THE PREFERRED EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
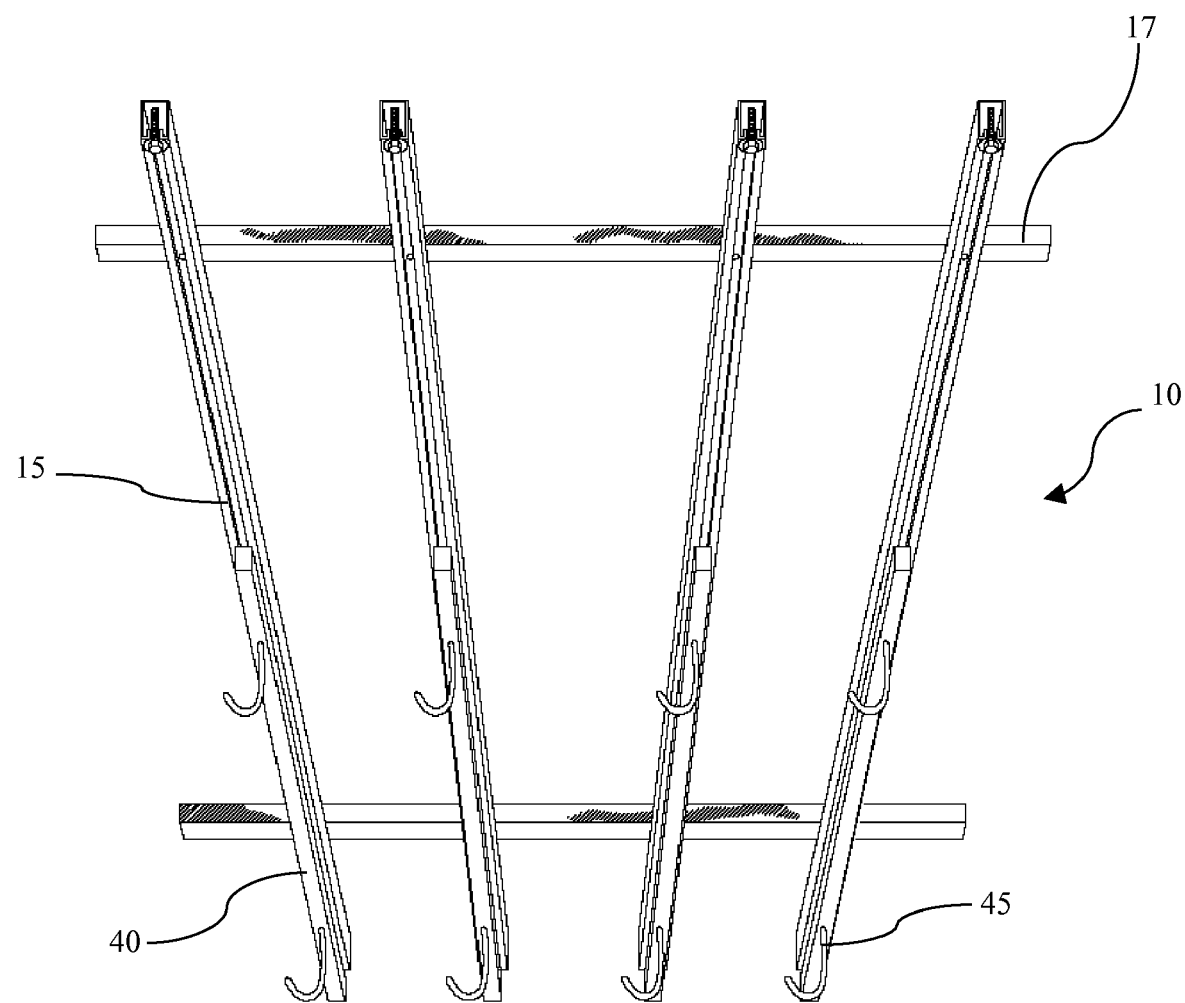
FIG. 1 is a perspective view of the novel bike rack as mounted to a ceiling showing the sliding nature of the individual rack mounts.
Figure 2:
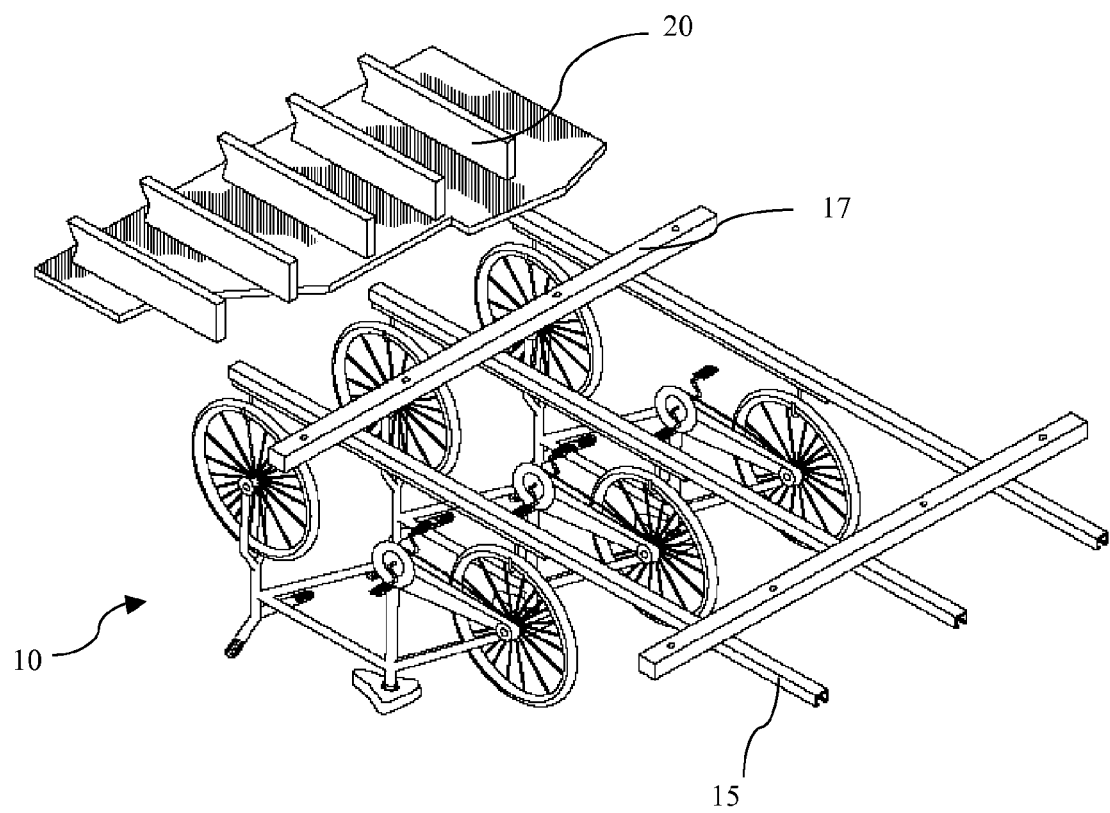
FIG. 2 is an elevated view of the novel bike rack as mounted to a ceiling showing multiple bicycles in inverted fashion supported by the wheel hooks.
Figure 3:
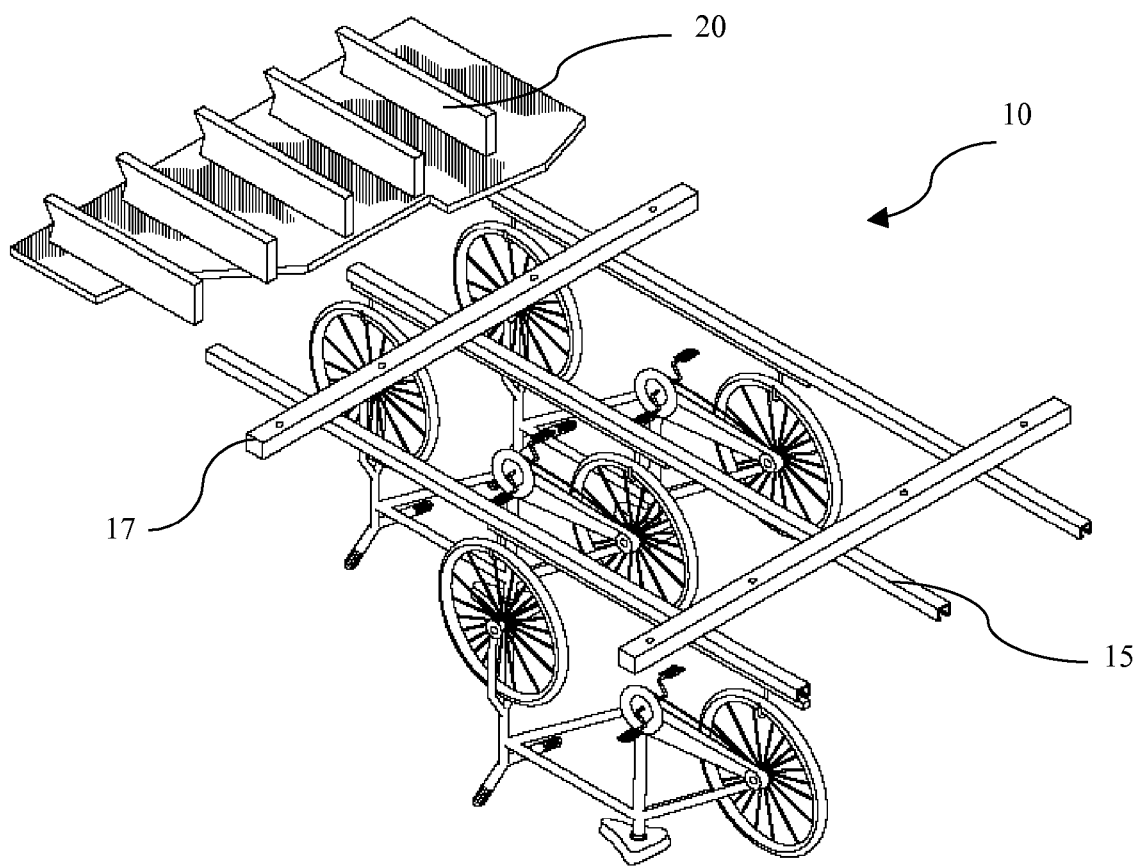
FIG. 3 is an elevated view of the novel bike rack as mounted to a ceiling showing the movement of the bicycles in inverted fashion supported by the wheel hooks on the rack.

Referring now to FIG. 1, novel bike rack 10 comprises at least one, but normally a plurality of, longitudinal track 15 mounted to a ceiling. For maximum support, longitudinal tracks 15 are mounted on transverse supports 17 or directly to ceiling joists. Where multiple racks are required, longitudinal tracks 15 can be mounted in a perpendicular fashion. Longitudinal tracks 15 can be mounted to a plurality of transverse supports 17, as shown in FIGS. 1-3. In this embodiment it is possible to place tracks at any desired from each other rather than depending on the spacing of the ceiling joists. Installation is simplified by installing transverse supports 17 directly to the ceiling, preferably to ceiling joists 20. Longitudinal tracks 15 can then be added directly to transverse supports 17. In yet another embodiment, longitudinal tracks 15 engage slideabley with transverse supports 17 to allow maximum adjustability of their position. When the desired position is achieved longitudinal tracks 15 can be locked in place along transverse axis of supports 17.

Sliding bars 40 depend from longitudinal tracks 15 and bear a number, usually two (2), of receiving hooks 45. In one embodiment, the weight of the bike is distributed between receiving hooks 45. Sliding bars 40 also preventing canting of the wheels within C-channel. Receiving hooks 45 orient upward thus allowing them to receive the wheels of inverted bikes, as shown in FIGS. 2 and 3. Bikes are hung such that the longitudinal axis of the bike corresponds with that of longitudinal track 15.

Where multiple racks are used, for multiple bikes, it is preferred that the bikes are oriented similarly such that the front wheels are positioned similarly. It is possible however to alternate the disposition of the bikes so long as the distance between longitudinal tracks is sufficient to accommodate the lateral requirements, i.e. the handlebars, of the bikes. Closer storage can be achieved by loosening the handle bars of the inverted bikes and aligning them along the longitudinal axis of the bike (as well as longitudinal tracks 15). It is also possible to provide receiving hooks of varying length on adjacent racks, thereby staggering neighboring bikes to allow closer placement of the racks.

Figure 4:
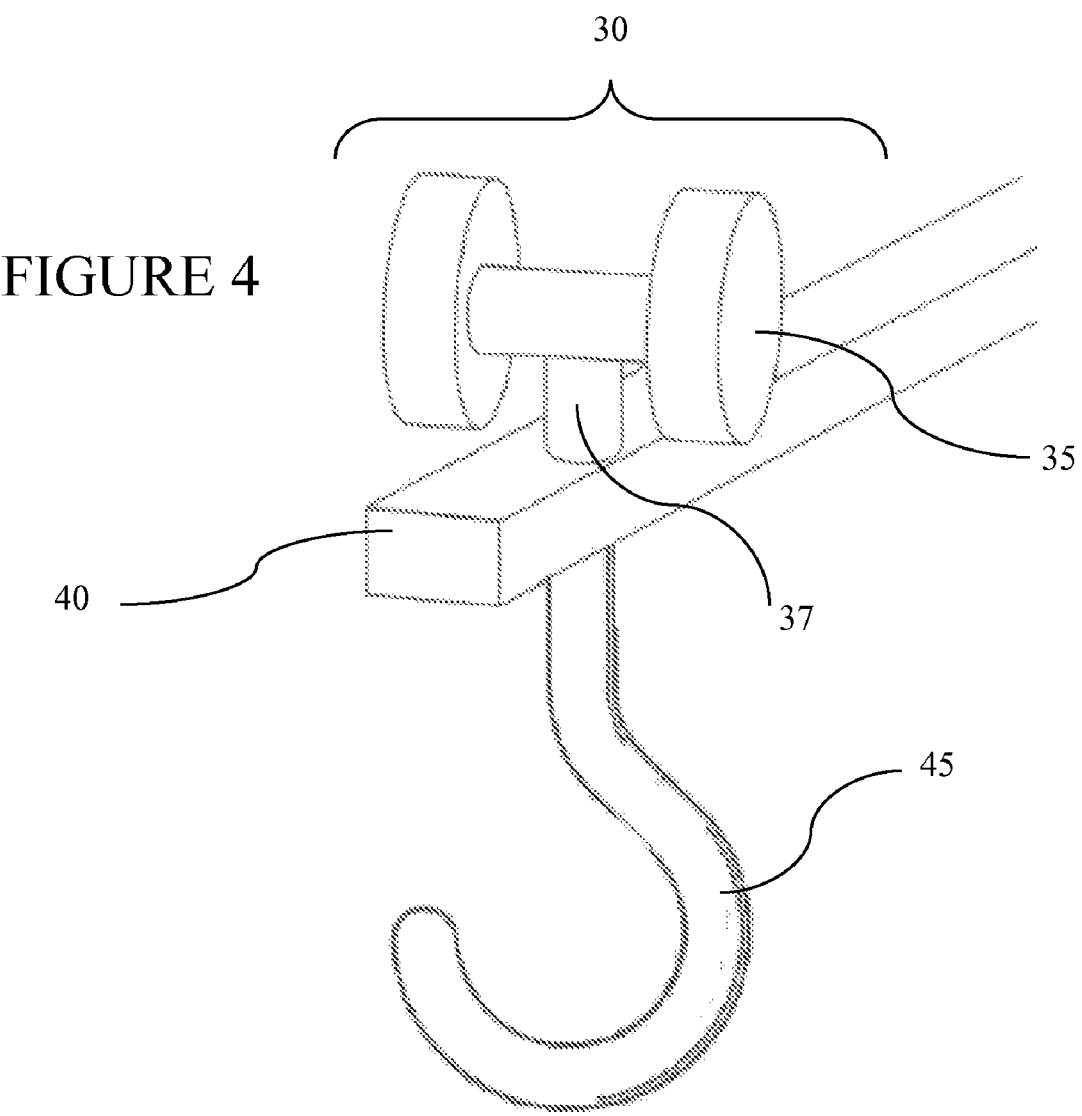
FIG. 4 is a perspective view of the wheel carriage assembly.

When multiple longitudinal tracks are employed, longitudinal tracks 15 are spaced apart and are generally parallel. Each longitudinal track 15 is preferably a C-channel member having an upper wall flanked by vertical side walls which terminate in horizontal lips. Wheel carriage 30 (FIG. 4) rides within longitudinal track 15 and is equipped with a plurality of carriage wheels 35 which rotate in a vertical plane and are supported by the vertical lips of the C-channel. The horizontal lips of the C-channel extend toward one another defining a gap therebetween. Support member 37 connects carriage 30 to sliding bar 40. Support member 37 traverses the length of longitudinal track 15 within the gap defined by the horizontal lips of the C-channel.

Figure 5:
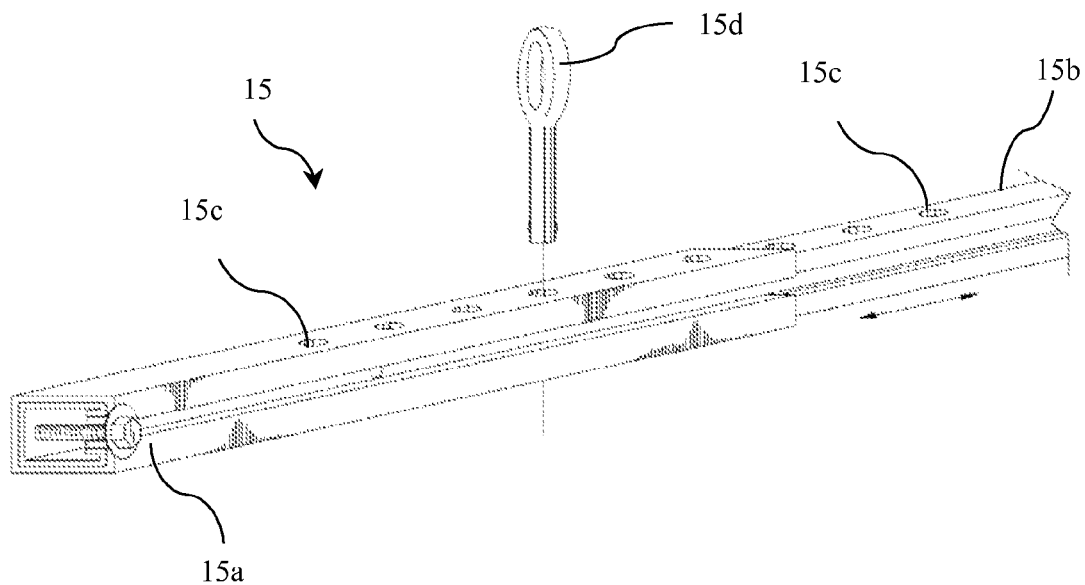
FIG. 5 is a perspective view of a telescoping longitudinal track.
Figure 6:
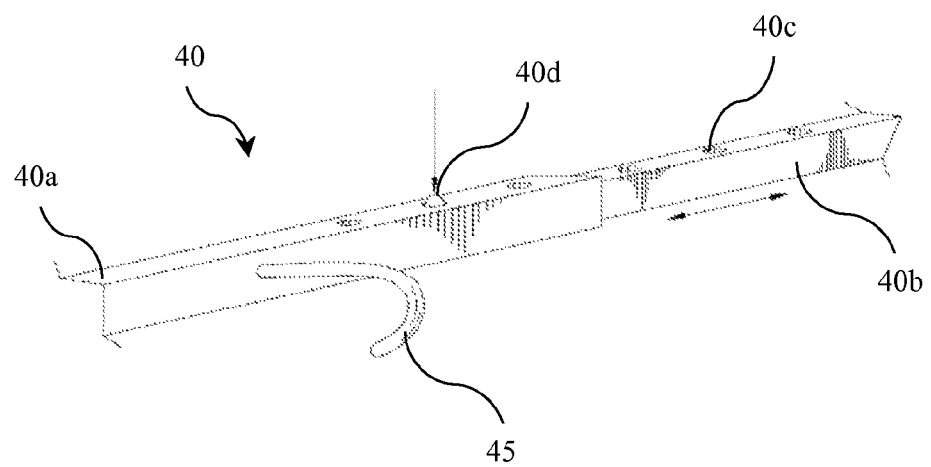
FIG. 6 is a perspective view of a telescoping sliding bar.
Figure 7:
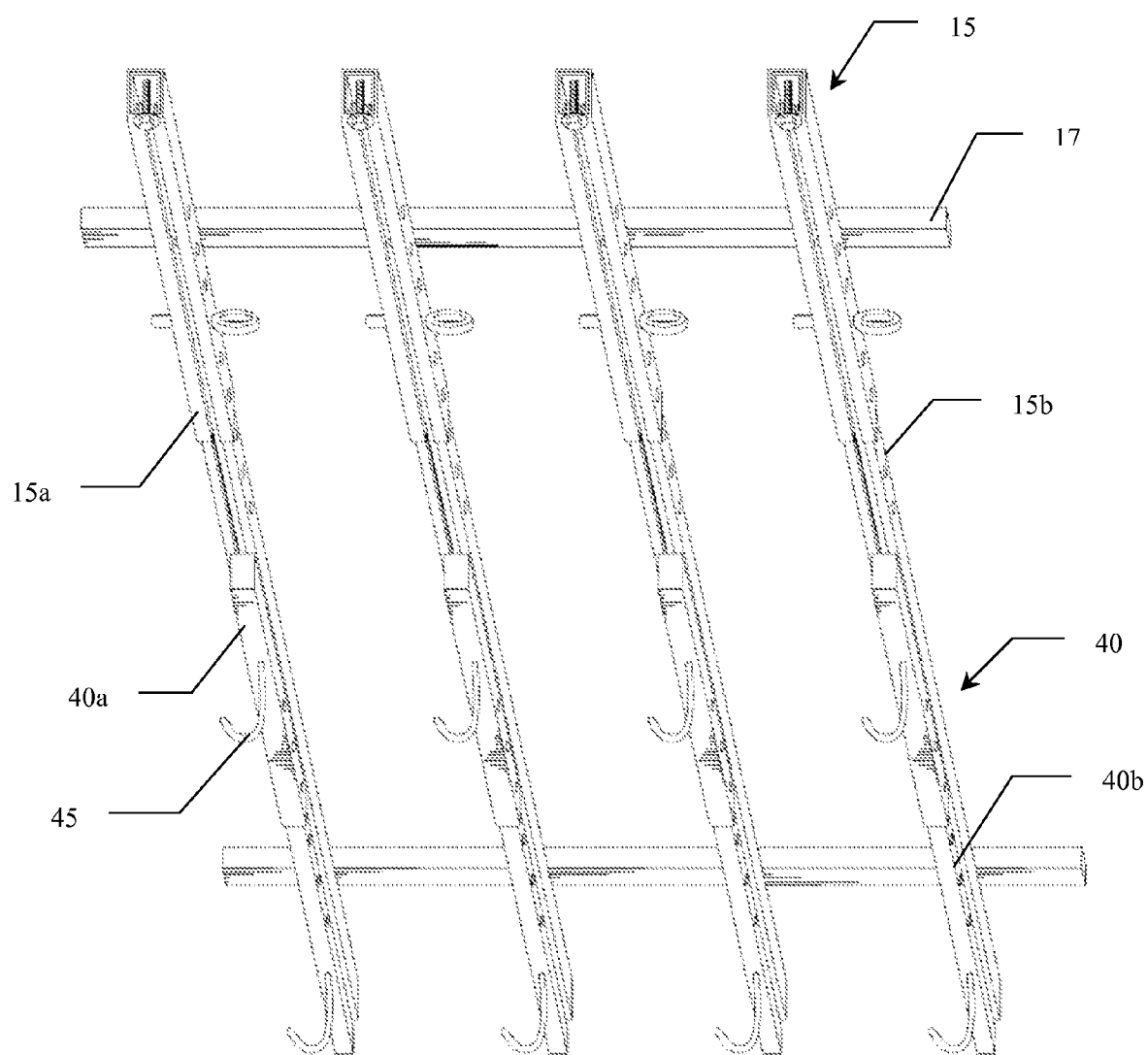
FIG. 7 is a perspective view of the novel bike rack as mounted to a ceiling with telescoping longitudinal tracks and sliding bar.

In an alternate embodiment, shown if FIGS. 5 and 6, longitudinal track 15 is adjustable along its length. In the embodiment shown in FIG. 5 track 15 comprises larger track 15a which accepts smaller track 15b. Along the length of each track are holes 15c. Pin 15d is inserted through holes 15c to fix the length of track 15 when adjusted to the desired length. This embodiment is not limited to the method of adjusting the length of track 15 shown in FIG. 5. It is important however that the fixing mechanism (i.e. pin 15d) not interfere with wheel carriage 30 or the movement of sliding bar 40. Various methods of providing a telescoping track are known and any method which allows the length of track 15 to be altered is envisioned. Providing telescoping track 15 allows the inventive apparatus to be used in areas where varying support surfaces are available as well as making shipping and storing easier.

Other methods of adjusting the length of longitudinal track 15 are contemplated. For example, it is possible to place at a desired position along the length of longitudinal track 15, the track can then be folded upon itself to reduce its length, i.e. to assist in shipping.

In a similar manner, sliding bar 40 can be adapted to adjust along its length. In the embodiment shown in FIG. 6 sliding bar 40 comprises larger bar 40a and smaller bar 40b. Along the length of the bar are holes 40c. The embodiment shown in FIG. 6 employs a pawl system wherein pawl 40d engages the proper hole 40c when the desired length of bar 40 is reached. Various methods of providing a telescoping bar are known and any method which allows the length of bar 40 to be altered is envisioned. Providing telescoping bar 40 allows the inventive apparatus to be used when bicycles of varying size, i.e. children's bicycles, are being stored as well as making shipping and storing easier.

In one embodiment, sliding bar 40 is removed and receiving hooks 45 ride independently of each other in the longitudinal tracks. In an alternative embodiment the wheels may be removed in favor of any device which is capable of sliding along the longitudinal tracks with minimal friction.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might fall therebetween. Now that the invention has been described,

What is claimed is:

1. A bicycle storage rack, comprising:
   a first elongate channel member having a back wall, a pair of parallel side walls formed integrally with said back wall and depending from opposite edges thereof in normal relation to said back wall;
   said back wall adapted to be secured to a ceiling;
   a pair of capture walls;
   each of said side walls having a substantially ninety degree (90°) bend formed therein to form said pair of capture walls;
   each capture wall of said pair of capture walls being disposed in a plane substantially parallel to a plane of said back wall;
   a gap of uniform extent being disposed between the capture walls of said pair of capture walls;
   a first pair of laterally disposed wheels;
   a first axle having opposite ends, there being one wheel of said first pair of laterally disposed wheels journaled to each end of said first axle;
   each wheel of said pair of laterally disposed wheels being adapted to rollingly engage a different capture wall of said opposed pair of capture walls;
   a second pair of laterally disposed wheels;
   a second axle having opposite ends, there being one wheel of said second pair of laterally disposed wheels journaled to each end of said second axle;
   each wheel of said second pair of laterally disposed wheels being adapted to rollingly engage a different capture wall of said opposed pair of capture walls;

an elongate, rigid support member having a top wall and a bottom wall;

a first rigid post interconnecting said first axle to a leading end of said top wall of said elongate, rigid support member;

a second rigid post interconnecting said second axle to a trailing end of said top wall of said elongate, rigid support member;

a first hook depending from a leading end of said bottom wall of said elongate, rigid support member;

a second hook depending from a trailing end of said bottom wall of said elongate, rigid support member;

whereby said first and second hooks are adapted to support a bicycle;

said first elongate channel member having a longitudinal extent greater than a longitudinal extent of said elongate, rigid support member so that said elongate, rigid support member is adapted to be manually movable from a first end of said first, elongate channel member to a second end of said first elongate channel member, said first and second pair of wheels rollingly engaging said capture walls when said rigid support member is manually moved from said first end to said second end of said first elongate channel member;

said first and second hooks being a fixed distance apart from one another and remaining a fixed distance apart from one another when said rigid support member is manually moved from said first end to said second end of said elongate channel.

2. The bicycle storage rack of claim 1, further comprising:

a second elongate channel member having a structure like that of said first elongate channel member but having larger dimensions so that said second elongate channel member is adapted to telescopically receive said first elongate channel member;

said respective sidewalls of said first and second elongate channel members having a plurality of apertures formed in them along their respective extents so that a transversely disposed pin can lock said first and second elongate channel members into any pre-selected position of telescopic adjustment.

* * * * *